(12) United States Patent
Hirano et al.

(10) Patent No.: US 8,508,798 B2
(45) Date of Patent: Aug. 13, 2013

(54) RECORDING MEDIUM, COLOR CONVERSION TABLE CREATING APPARATUS AND COLOR CONVERSION TABLE CREATING METHOD

(75) Inventors: Sachiko Hirano, Hino (JP); Toru Hoshino, Nakano-ku (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 372 days.

(21) Appl. No.: 12/944,144

(22) Filed: Nov. 11, 2010

(65) Prior Publication Data
US 2011/0116116 A1 May 19, 2011

(30) Foreign Application Priority Data

Nov. 19, 2009 (JP) ................. 2009-263451

(51) Int. Cl.
*H04N 1/60* (2006.01)
*G06K 15/00* (2006.01)
*H04N 1/40* (2006.01)

(52) U.S. Cl.
USPC .......................................... 358/1.9; 358/3.23

(58) Field of Classification Search
None
See application file for complete search history.

(56) References Cited

U.S. PATENT DOCUMENTS 5,452,019 A 9/1995 Fukuda et al.
7,557,959 B2 * 7/2009 Kajihara ................ 358/2.1

FOREIGN PATENT DOCUMENTS

| CN | 1041882 A | 1/1999 |
| CN | 1379584 A | 11/2002 |
| EP | 1 223 745 B1 | 10/2006 |
| JP | 2898030 B2 | 5/1999 |
| JP | 2004-56271 A | 2/2004 |
| JP | 2004200955 A | 7/2004 |
| JP | 2007170883 A | 7/2007 |

OTHER PUBLICATIONS

Office Action from the Patent Office of the People's Republic of China date Feb. 4, 2013, issued in corresponding Chinese Patent Application No. 201010547454.2, with English translation thereof.

* cited by examiner

*Primary Examiner* — Douglas Tran
(74) *Attorney, Agent, or Firm* — Buchanan Ingersoll & Rooney PC

(57) ABSTRACT

Disclosed is a recording medium recording a program for a computer to perform the following functions of: creating first corresponding information to show color value corresponding to a combination of values of black and three basic colors when a plurality of color patches are each output; creating second corresponding information to correspond the combination of values of black and three basic colors to a virtual basic color axis coordinate; creating third corresponding information to show color value corresponding to the virtual basic color axis coordinate; and obtaining virtual basic color axis coordinate corresponding to the color value, obtaining a combination of values of black and three basic colors corresponding to the obtained virtual basic color axis coordinate, and storing the obtained combination of values of black and three basic colors as a combination of values of black and three basic colors corresponding to the color value.

9 Claims, 19 Drawing Sheets

FIG. 7

| VIRTUAL BASIC COLOR AXIS COORDINATE | | | DEVICE VALUE (%) | | |
|---|---|---|---|---|---|
| VIRTUAL C | VIRTUAL M | VIRTUAL Y | C | M | Y |
| Min | Min | AxMax | 0 | 0 | 100 |
| Min | DevMax | AxMax | 0 | 100 | 100 |
| Min | AxMax | Min | 0 | 100 | 0 |
| Min | AxMax | DevMax | 0 | 100 | 100 |
| Min | AxMax | AxMax | 0 | 100 | 100 |
| DevMax | Min | AxMax | 100 | 0 | 100 |
| DevMax | DevMax | AxMax | * | * | 100 |
| DevMax | AxMax | Min | 100 | 100 | 0 |
| DevMax | AxMax | DevMax | * | 100 | * |
| DevMax | AxMax | AxMax | * | 100 | 100 |
| AxMax | Min | Min | 100 | 0 | 0 |
| AxMax | Min | DevMax | 100 | 0 | 100 |
| AxMax | Min | AxMax | 100 | 0 | 100 |
| AxMax | DevMax | Min | 100 | 100 | 0 |
| AxMax | DevMax | DevMax | 100 | * | * |
| AxMax | DevMax | AxMax | 100 | * | 100 |
| AxMax | AxMax | Min | 100 | 100 | 0 |
| AxMax | AxMax | DevMax | 100 | 100 | * |

*: 100−MAXIMUM REDUCTION VALUE

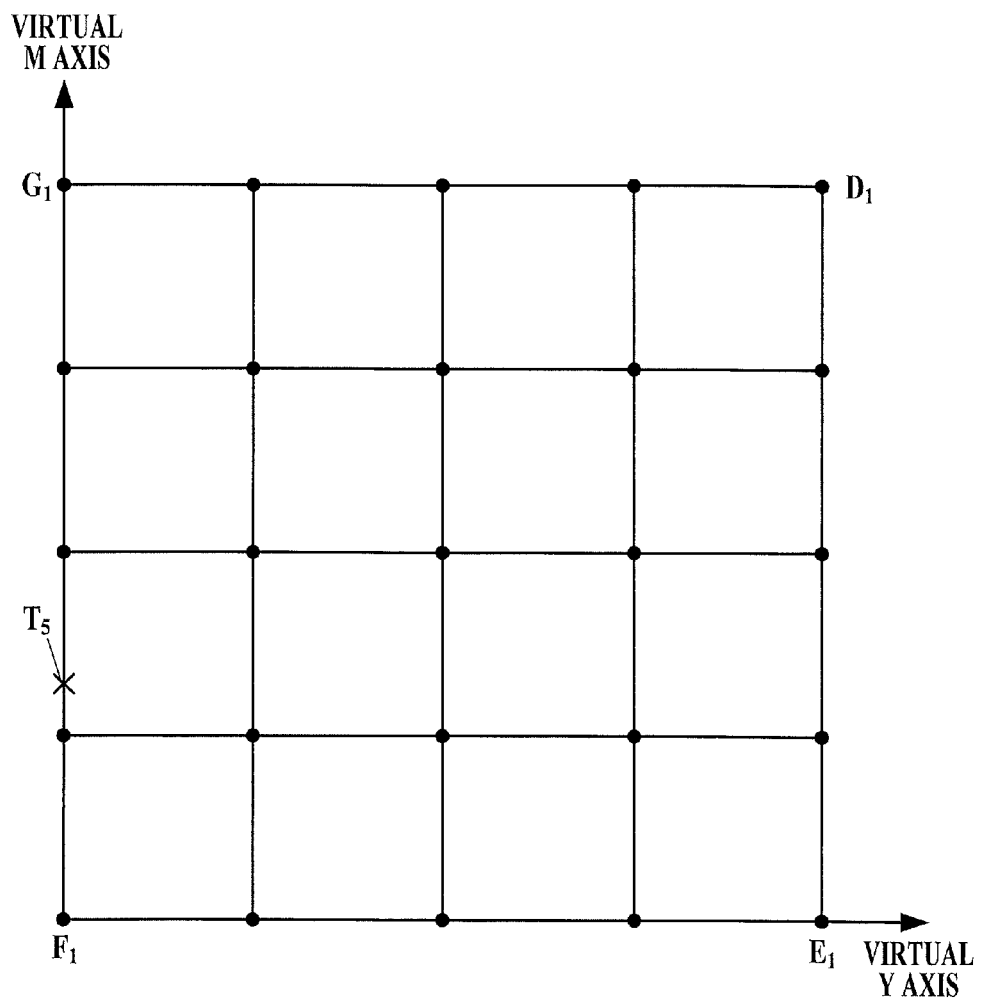

RECORDING MEDIUM, COLOR CONVERSION TABLE CREATING APPARATUS AND COLOR CONVERSION TABLE CREATING METHOD

BACKGROUND

1. Field of the Invention

The present invention relates to a recording medium, a color conversion table creating apparatus and a color conversion table creating method.

2. Description of Related Art

Conventionally, in order to adjust the output color of a printer to a desired color, an ICC (International Color Consortium) profile, etc. is used. When an ICC profile is created, a LUT (Look Up Table) of "color value to device value" needs to be created in order to convert a color value (L*a*b*, etc.) which does not depend on the device to a device value (CMYK value) which the printer is to output. This LUT is called B to A table in the ICC profile. The B to A table outputs a chart including a plurality of color patches with a printer and is created based on the device value corresponding to each color patch and the color value obtained by measuring the color of each color patch.

However, when a general profile chart such as ISO 12642 is used, since a plurality of combinations of the CMYK value in which the K value is different with respect to a measured color value is possible, even if the device value (CMYK value) is calculated back from the color value using the colorimetric result of the chart, the device value cannot be uniquely settled.

Therefore, there is a method used in which a unique chart fixing the CMYK value so that the color value does not overlap is output and the LUT of the "color value to device value" is calculated back using the colorimetric value (see Japanese Patent Application Laid-Open Publication No. 2004-56271). With this method, since a unique chart is used, the colorimetric value cannot be used in or compared with other systems. Also, the device value which can be used in the chart is fixed, and it is not possible to add a value where the ratio of the K value and the CMY value is changed within the sufficient inner part (not in the vicinity of the border of inside and outside of the color gamut but a portion where the color can be sufficiently reproduced) of the color gamut which can have a plurality of device values.

Also, there is a proposed method in which the color value obtained from measuring the color of the color patch is first converted to the appropriate device CMY value and then the CMY value is converted to the CMYK value. The K value is not used when the color value is converted to the device CMY value and therefore the K value is uniquely determined. However, experience and trial and error is necessary to convert the CMY value to CMYK value while accurately maintaining the color value.

Therefore, a method is proposed which uses a general purpose chart such as an ISO 12642 and uses virtual CMY coordinates determined by a virtual CMY axis (virtual basic color axis) as an intermediate field when calculating (see Japanese Patent No. 2898030). In the virtual CMY coordinate, the color value is corresponded to the selected device value (CMYK value) so as not to overlap and further the color value (L*a*b*, etc.) of the color patch output at each device value is also corresponded. Then, the virtual CMY coordinate corresponding to each color value which is to be described in the LUT of the "color value to device value" is calculated back and the device value corresponding to each color value is obtained through the virtual CMY coordinate.

According to the method described in Japanese Patent No. 2898030, the continuity is emphasized, and therefore, as for the CMY, the device CMY value is corresponded to the virtual CMY coordinate as is. In other words, as the coordinate of the virtual CMY axis increases, only the device value corresponding to the axis increases. Also, as for K, the device K value is determined according to the minimum value of the virtual CMY coordinate. Specifically, the larger the minimum value of the virtual CMY coordinate is, the larger the device K value is.

However, among the device values which compose the color patch on the chart, the device value (and the colorimetric value corresponding to the device value) which is not corresponded to the virtual CMY coordinate cannot be used in the output of the printer. In other words, the range of the color gamut which can be used in the printer changes according to how the device value is corresponded to the virtual CMY coordinate. Also, within the sufficient inner part of the color gamut which can have a plurality of device values, how the ratio of the K value and the CMY value is selected influences the variation stability and the graininess of the printer and relates to the continuity of the device value when the color is converted, and therefore the gradation (smoothness of change of color) of the output image is influenced. Therefore, how the device value is corresponded to the virtual CMY coordinate is an important factor which influences the final color conversion performance.

Conventionally, the method described in Japanese Patent No. 2898030 has been mainly used to create a profile of a device such as high end proofer which needs highly accurate color matching. Therefore, in order to prevent a false outline or strangeness, continuity of the device CMYK value is necessary and the virtual CMY coordinate is created with emphasis on the continuity of the corresponding device value. The device value corresponded to the virtual CMY coordinate does not use the entire theoretical color gamut the printer has, and results in not being able to use a portion of the color gamut in the vicinity of the most outer periphery of the color gamut (low brightness and high saturation). However, when used in the high end proofer with no limit of amount of color material, there has been no large problem in practical use.

As a color coordinate system to indicate the color value, there are several types such as L*a*b*, L*u*v*, etc., and the method of configuration is different in each system. However, basically, a color value is placed in a space including an axis which represents brightness (L*, etc.) and a plane which represents saturation and hue (a*b* plane, etc.). Generally, the color gamut of a printer, etc. has a wide area on the plane of the saturation and the hue when the brightness is about moderate, and when a certain hue is a target, the lower the saturation is, the larger the brightness area is. In other words, the most outer periphery of the color gamut is a "set of a point where the saturation is highest in each brightness or the point where the brightness is highest or lowest in each hue and saturation". Also, the vicinity of the most outer periphery of the color gamut includes an area which is slightly on the inner side of the most outer periphery of the color gamut.

In an electrophotographic printer, in most cases, there is a constraint in the apparatus of the amount of toner which can be used (total CMYK value) and in many cases, conversion processing (limit of toner amount) is performed to lower the CMYK value in the data. When limit of toner amount is performed, especially in a case where the total CMYK value is limited to less than 300% or in a case where the device CMY value is reduced more than the device K value when the toner amount is limited, the color gamut which cannot be used becomes even larger (the color gamut which can be used becomes even smaller) and there has been a problem of resulting in reduction of color reproducibility.

SUMMARY

The present invention has been made in consideration of the above problems, and it is one of main objects to enlarge the color gamut which the printer can output.

In order to achieve at least one of the above-described objects, according to an aspect of the present invention, there is provided a recording medium recording a program for a computer which creates a color conversion table to convert a color value to a combination of values of black and three basic colors with hue different from each other to be output by a printer, the computer to allow a control section to perform the following functions of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

Preferably, in the recording medium, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

Preferably, in the recording medium, in the corresponding of the value of black to the virtual basic color axis coordinate in the second corresponding information, the value of black weakly monotonically increases as the minimum value among the three values of the virtual basic color axis coordinate increases.

BRIEF DESCRIPTION OF THE DRAWINGS

The present invention will become more fully understood from the detailed description given hereinbelow and the appended drawings, and thus are not intended to define the limits of the present invention, and wherein;

FIG. 7 is a diagram showing device CMY values of a coordinate where the value of the virtual basic color axis coordinate is a combination of Min, DevMax and AxMax;

FIG. 19 is a diagram showing a target value of the virtual YM coordinate system.

DETAILED DESCRIPTION OF PREFERRED EMBODIMENTS

An example of a color conversion table creating apparatus of the present embodiment is described below.

Figure 1:
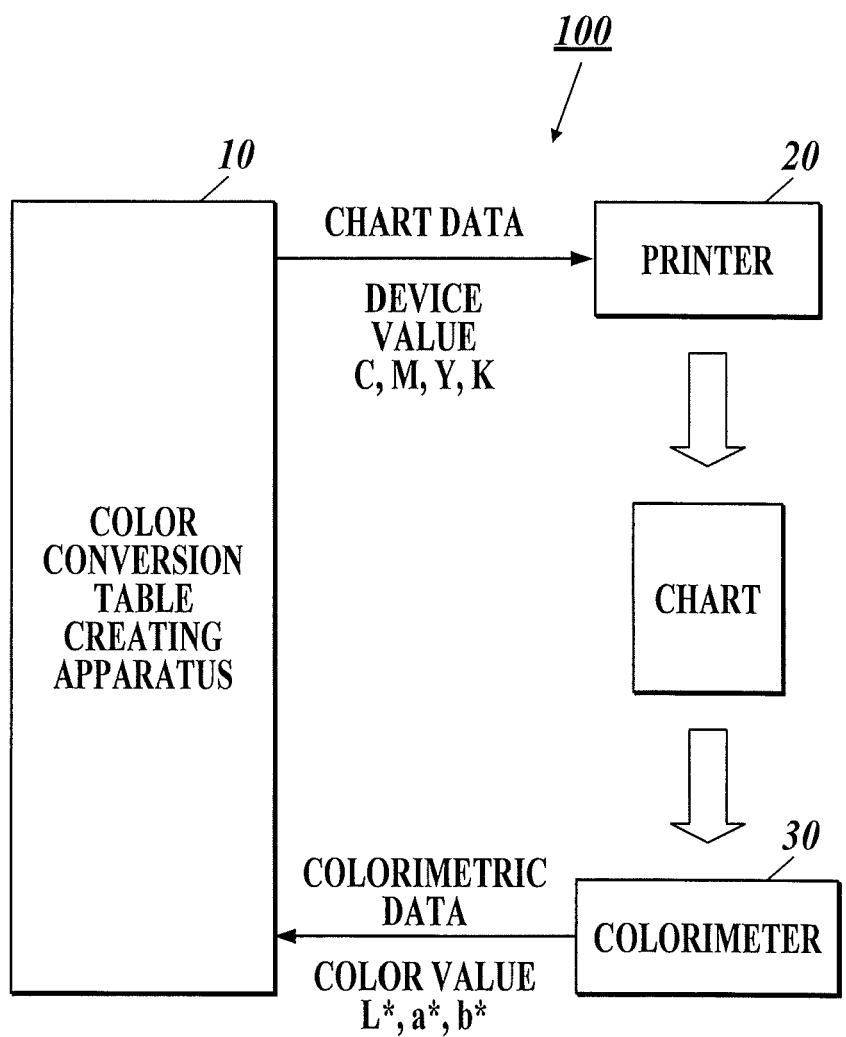
FIG. 1 is a diagram of a system configuration of a color conversion system.

FIG. 1 shows a system configuration of the color conversion system 100. As shown in FIG. 1, the color conversion system 100 includes a color conversion table creating apparatus 10, printer 20, colorimeter 30, and the like.

The color conversion table creating apparatus 10 obtains colorimetric data 173 (see FIG. 2) obtained by measuring the color of the chart output on the printer 20 with the colorimeter 30 and creates a color conversion table 174 (see FIG. 2) to convert a color value to a device value (CMYK value) to be output by the printer 20.

The printer 20 is an electrophotographic printer which forms an image with toner of cyan, magenta, yellow and black based on a device value (CMYK value). In other words, the printer 20 is a printer which uses black (K) and three basic colors (CMY) with a hue different from each other.

The colorimeter 30 measures the color of each color patch included in the chart with spectrometry. The colorimetric data 173 is described with a color coordinate system such as L*a*b* which does not depend on the device. In the present embodiment, an example is described using the L*a*b* color coordinate system.

Figure 2:
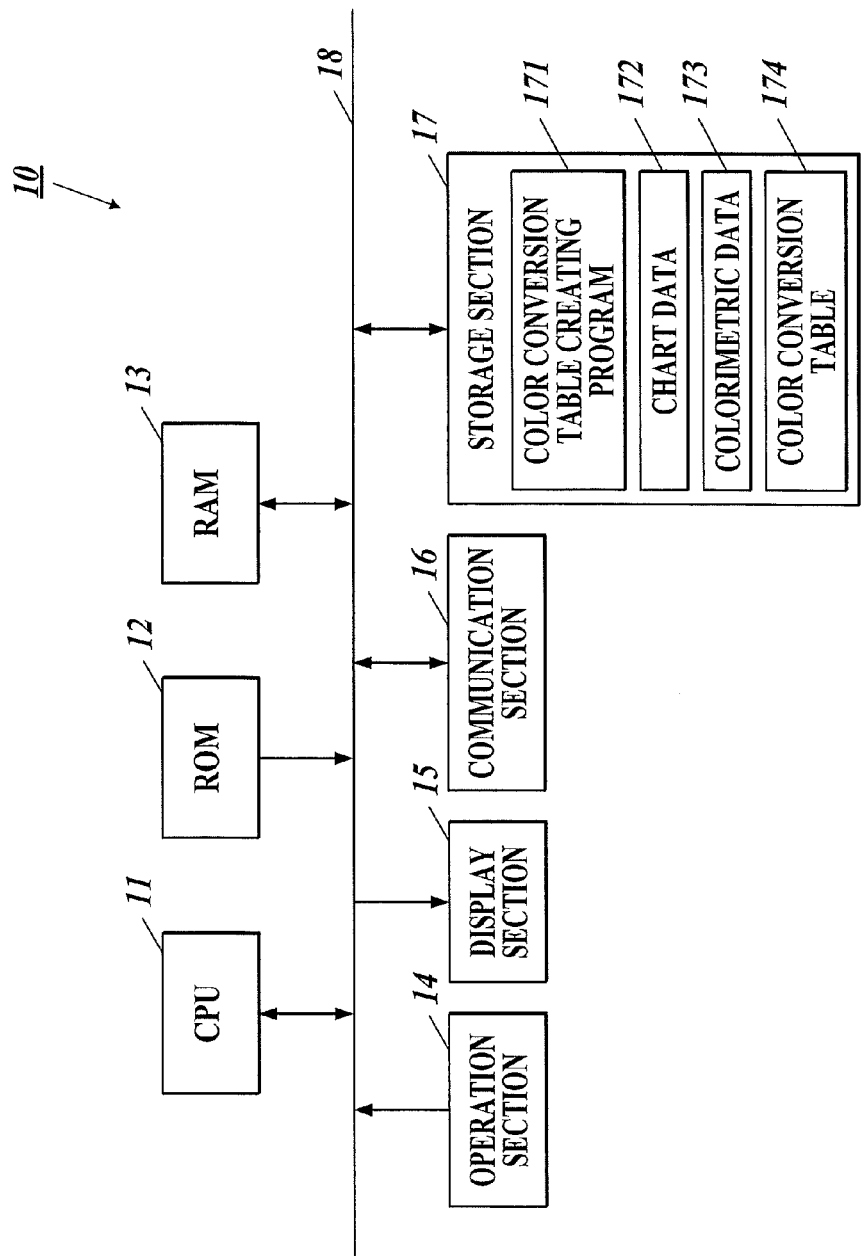
FIG. 2 is a block diagram showing a functional configuration of a color conversion table creating apparatus.

FIG. 2 shows a functional configuration of the color conversion table creating apparatus 10.

As described in FIG. 2, the color conversion table creating apparatus 10 includes a CPU (Central Processing Unit) 11, a ROM (Read Only Memory) 12, a RAM (Random Access Memory) 13, an operation section 14, a display section 15, a communication section 16, a storage section 17 and the like, and each section is connected to each other by a bus 18. The color conversion table creating apparatus 10 is implemented by a general PC (Personal Computer).

The CPU 11 centrally controls the processing operation of each section of the color conversion table creating apparatus 10. According to an operation signal input from the operation section 14 or an instruction signal received from the communication section 16, the CPU 11 reads out various processing programs stored in the ROM 12 or storage section 17 to expand in the RAM 13 and the CPU 11 performs various processing in conjunction with the program.

The ROM 12 is configured with a nonvolatile semiconductor memory, etc. and stores a control program and parameters, files, etc. necessary to perform the program.

The RAM 13 forms a work area to temporarily store various processing programs performed by the CPU 11 and data regarding these programs.

The operation section 14 includes a keyboard including a cursor key, character input keys, and various function keys, and a pointing device such as a mouse to receive operation input from the user. The operation section 14 outputs the operation signal input by the key operation of the keyboard and the mouse operation to the CPU 11.

The display section 15 includes an LCD (Liquid Crystal Display) and displays various operation screens and various processing results according to an instruction from the CPU 11.

The communication section 16 performs transmitting and receiving of data with external devices. For example, the communication section 16 transmits chart data 172 to the printer 20. Also, the communication section 16 receives colorimetric data 173 from the colorimeter 30.

The storage section 17 includes a storage device such as a hard disk, etc. and stores various processing programs, data concerning the processing program, etc. For example, the storage section 17 stores a color conversion table creating program 171, chart data 172, colorimetric data 173, color conversion table 174, etc.

The color conversion table creating program 171 is a program to perform a later described color conversion table creating processing (see FIG. 4) and is stored in the storage section 17 in advance.

The chart data 172 is data indicating the device value (CMYK value) corresponding to each of the plurality of color patches included in the chart, and is stored in the storage section 17 in advance.

The colorimetric data 173 is data indicating color value of each color patch in which color is measured by the colorimeter 30 and obtained from the colorimeter 30 through the communication section 16.

The CPU 11 obtains through the communication section 16 the colorimetric data 173 obtained by measuring with the colorimeter 30 the color of the result of output from the printer 20 of the chart configured from a plurality of color patches.

The CPU 11 creates a color conversion table 174 (LUT of "color value to device value") to convert the color value (L*a*b*) which does not depend on the device (printer 20) to a combination of values (device value) of black and three basic colors which are to be output from the printer 20. The "virtual basic color axis coordinate" is used as the intermediate field in the process of creating the color conversion table 174.

The CPU 11 creates a LUT (first corresponding information) of "device value to color value" showing a color value corresponding to the combination of values (device value) of black and three basic colors when a plurality of color patches are each output, on the basis of the color value obtained by measuring the color of each of the plurality of color patches output from the printer 20.

The CPU 11 creates a corresponding relation (second corresponding information) of the "virtual basic color axis coordinate to device value" corresponding the combination of the values (device value) of black and three basic colors to the virtual basic color axis coordinate determined by the three virtual basic color axes (virtual C axis, virtual M axis, virtual Y axis) corresponding to each of the three basic colors (CMY).

The CPU 11 creates a LUT (third corresponding information) of the "virtual basic color axis coordinate to color value" indicating color value corresponding to the virtual basic color axis coordinate based on the corresponding relation of "virtual basic color axis coordinate to device value" and the LUT of the "device value to color value".

The CPU 11 obtains the appropriate coordinate of the virtual basic color axis coordinate from the color value and then obtains the corresponding device value to create the LUT (color conversion table 174) of the "color value to device value". Specifically, the CPU 11 obtains the virtual basic color axis coordinate corresponding to the color value based on the LUT of the "virtual basic color axis coordinate to color value" with respect to each color value to be stored in the LUT of the "color value to device value". Then, the CPU 11 obtains the combination of the values (device value) of black and three basic colors corresponding to the obtained virtual basic color axis coordinate based on the corresponding relation of "virtual basic color axis coordinate to device value". Then, the CPU 11 stores the obtained combination of the values of black and three basic colors in the LUT of the "color value to device value" as the combination of the values of black and three basic colors corresponding to the color value.

In the corresponding of the value (device CMY value) of three basic colors to the virtual basic color axis coordinate in the corresponding relation of "virtual basic color axis coordinate to device value", there is a portion where, as the coordinate of one virtual basic color axis increases, the value of basic color corresponding to at least one other virtual basic color axis reduces. For example, as the coordinate of the virtual M axis increases, there is a portion where the device C value or the device Y value corresponding to at least either of the virtual C axis or the virtual Y axis reduces.

Figure 3:
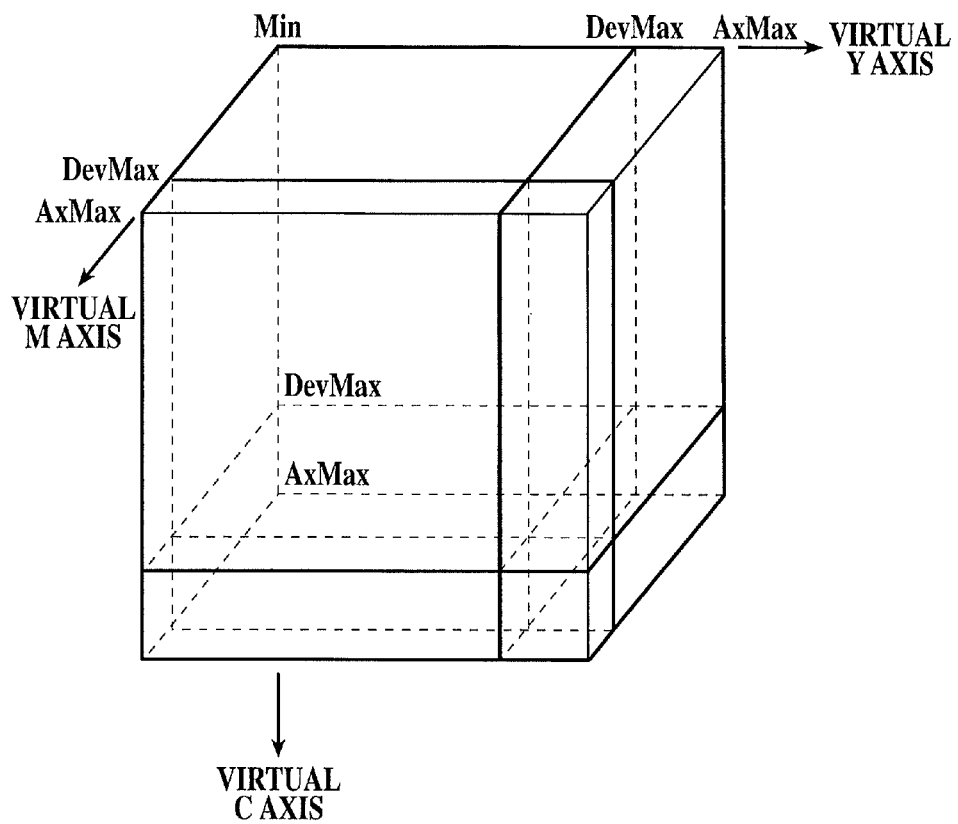
FIG. 3 is a diagram describing virtual basic color axis coordinate.

The virtual basic color axis coordinate configured from three virtual basic color axes (virtual C axis, virtual M axis, virtual Y axis) is described with reference to FIG. 3. The three virtual basic color axes respectively correspond to each of three basic colors (C, M, Y) of the printer 20.

Each of the virtual C axis, virtual M axis and the virtual Y axis starts from Min, passes through the coordinate where the device value of the corresponding basic color is the maximum value (referred to as DevMax) and further includes a coordinate to the maximum coordinate AxMax.

It is preferable that in the portion in which, as the coordinate of one virtual basic color axis (for example virtual M axis) increases, the value of basic color (for example, device C value, device Y value) corresponding to another virtual basic color axis (for example, virtual C axis, virtual Y axis) reduces, the value of the basic color is more than the coordinate which is to be the maximum value (DevMax) in the virtual basic color axis corresponding to at least one basic color other than the basic color where the value reduces.

For example, from (virtual C, virtual M, virtual Y)=(DevMax, 0, AxMax) to (virtual C, virtual M, virtual Y)=(DevMax, DevMax, AxMax), virtual Y=AxMax and virtual Y is more than DevMax. In this portion, as the coordinate of the virtual M axis increases, the device C value corresponding to the virtual C axis is reduced.

Also, from (virtual C, virtual M, virtual Y)=(DevMax, DevMax, DevMax) to (virtual C, virtual M, virtual Y)=(DevMax, AxMax, DevMax), virtual M is more than DevMax. In this portion, as the coordinate of the virtual M axis increases, the device C value corresponding to the virtual C axis is reduced, and as the coordinate of the virtual M axis increases, the device Y value corresponding to the virtual Y axis is reduced.

It is preferable that as for each of the three basic colors, the coordinate of the corresponding virtual basic color axis is DevMax, at least one of the coordinate of another virtual basic color axis is AxMax and the other is a most reduced value in a coordinate no less than DevMax. Here, the "most reduced value" is not the smallest value possible among the value of basic color but the minimum value in the "portion in which, as the coordinate of one virtual basic color axis increases, the value of basic color corresponding to another virtual basic color axis reduces". It is preferable that the "most reduced value" is 0. In other words, it is preferable that in the "portion in which, as the coordinate of one virtual basic color axis increases, the value of basic color corresponding to another virtual basic color axis reduces" each of the three basic colors reduces to 0.

For example, it is preferable that the device C value is the most reduced value from (virtual C, virtual M, virtual Y)= (DevMax, AxMax, DevMax) to (virtual C, virtual M, virtual Y)=(DevMax, AxMax, AxMax). Also, it is preferable that the device C value is the most reduced value from (virtual C, virtual M, virtual Y)=(DevMax, DevMax, AxMax) to (virtual C, virtual M, virtual Y)=(DevMax, AxMax, AxMax).

It is possible to prepare in advance a plurality of reduction ranges from the maximum value (100%) of the device CMY value when the value of three basic colors (device CMY value) is the "most reduced value" (hereinafter referred to as maximum reduction value) and to choose one among the above by specification by the user.

Also, the portion in which all of the virtual basic color axis coordinates are more than DevMax does not have to be included in the corresponding relation of "virtual basic color coordinate to device value". For the purpose of calculation processing, the coordinate can exist corresponded to a value which does not influence the color conversion processing. For example, all coordinates in which all coordinates of the three virtual basic color axes are more than DevMax can be corresponded to the maximum value (100%) of all device CMYK values.

Also, as for the coordinate in which all coordinates of the three virtual basic color axes are no more than DevMax, the device value (0 to 100%) of the corresponding basic color is corresponded without change to each coordinate (Min to DevMax) of the virtual basic color axis.

Also, as for the coordinate in which the coordinate of the virtual basic color axis is more than DevMax, the device value of the corresponding basic color is to be the maximum value (100%).

As for the corresponding of the value of black (device K value) to the virtual basic color axis coordinate in the corresponding relation of "virtual basic color axis coordinate to device value", as the minimum value among the three values of the virtual basic color axis coordinate increases, the value of black weakly monotonically increases. "Weakly monotonically increase" means there is a portion where a value is stable and does not increase, and means monotonically non-decreasing.

When the device K value is increased according to the minimum value among the three values of the virtual basic color axis coordinate, the form of increase can be partially different. For example, the form of increase of the device K value can be different between the "coordinates in which all coordinates of the three virtual basic color axes are not more than DevMax", and "coordinates other than the above".

Also, when the device K value increased according to the minimum value among the three values of the virtual basic color axis coordinate reaches the maximum value, it is preferable that the minimum value among the three values of the virtual basic color axis coordinate is no more than DevMax.

Also, a plurality of forms of increasing the device K value can be prepared in advance, and one of the above can be selected by user specification, etc. When the form of increase of the device K value is partially different, the selection can be made with respect to each portion or can be selected from a combination prepared in advance.

Next, the operation of the color conversion table creating apparatus 10 is described.

Figure 4:
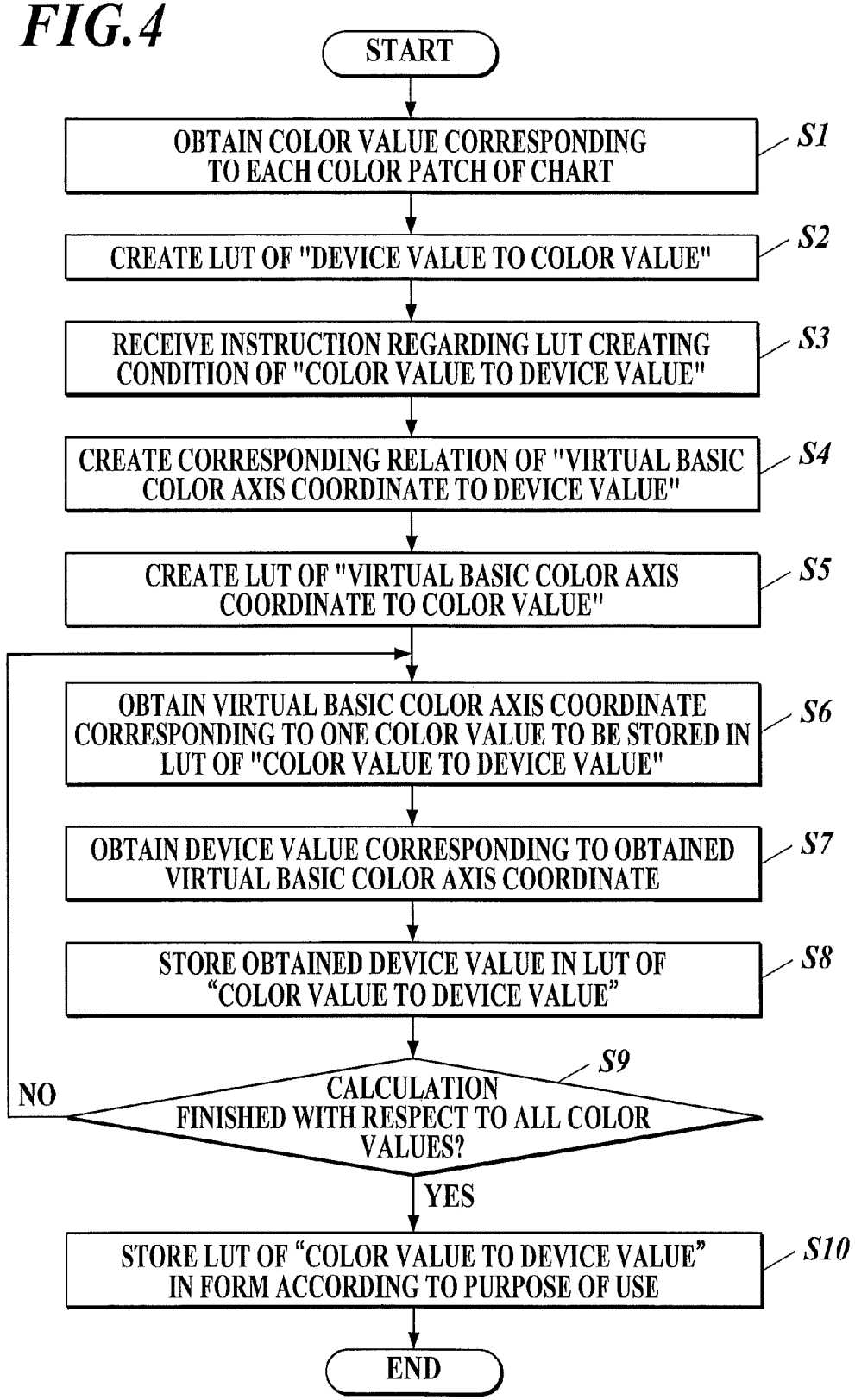
FIG. 4 is a flowchart showing a color conversion table creating processing performed by the color conversion table creating apparatus.

FIG. 4 is a flowchart showing a color conversion table creating processing performed by the color conversion table creating apparatus 10. The processing is a processing to create a LUT of "color value to device value" (color conversion table 174) and is realized by software processing by the CPU 11 in coordination with the color conversion table creating program 171 stored in the storage section 17.

First, the CPU 11 reads out the chart data 172 (CMYK value of the chart) from the storage section 17 and transmits the chart data 172 through the communication section 16 to the printer 20. It is preferable that the chart is a general purpose chart such as ISO 12642, etc. including a plurality of color patches which supports enough combinations of device values (CMYK values).

The printer 20 prints a plurality of color patches on a sheet based on the CMYK value of the chart and the chart is output. The printer 20 performs toner amount limiting processing when output is performed. For example, a patch which is C 100%, M 100%, Y 100%, K 100% with a total of 400% in the chart data is converted to C 60%, M 60%, Y 60%, K 100% with a total of 280% on a printer. It is assumed that necessary adjustment of the printer 20 such as maximum concentration correction of the engine, calibration of the halftone screen, etc. are performed in advance.

Each color patch of the chart output by the printer 20 is measured by a common colorimeter 30. Then, the CPU 11 obtains the color value (L*a*b*) corresponding to each color patch from the colorimeter 30 through the communication section 16 (step S1).

Next, the CPU 11 corresponds the obtained color value (L*a*b*) with the device value (CMYK value) when each color patch is output and the LUT of "device value to color value" is created (step S2). According to necessity, a device value which is actually not output and a color value corresponding to such device value is obtained from a color value corresponding to a neighborhood device value by common interpolation calculation, and the obtained values are added to the LUT of "device value to color value". The LUT of "device value to color value" corresponds to A to B table when creating an ICC device profile. The CPU 11 holds the created LUT of "device value to color value" in the RAM 13. Alternatively, the CPU 11 can write the LUT of "device value to color value" in a file and store the file in the storage section 17.

Next, the CPU 11 receives the instruction by the user from the operation section 14 regarding the creating condition of the LUT of "color value to device value" (color conversion table 174) (step S3). The creating condition of the LUT of "color value to device value" includes maximum reduction value, form of device K value increase with respect to the minimum value among the three values of the virtual basic color axis coordinate, etc. When the user inputs the creating condition from the operation section 14, the CPU 11 sets the creating condition as the creating condition of the LUT of "color value to device value".

Next, the CPU 11 determines the device value (CMYK value) corresponded to the virtual basic color axis coordinate (virtual CMY coordinate) and creates the corresponding relation of "virtual basic color axis coordinate to device value" (step S4).

Here, 21 grid points of [0] to [20] are on each virtual basic color axis. For example, Min=[0], DevMax=[16], and AxMax=[20]. The number of grid points can be set freely, however from the view point of accuracy and calculation load, it is preferable that the grid points are about 8 to 50 with respect to each virtual basic color axis.

Figure 5:
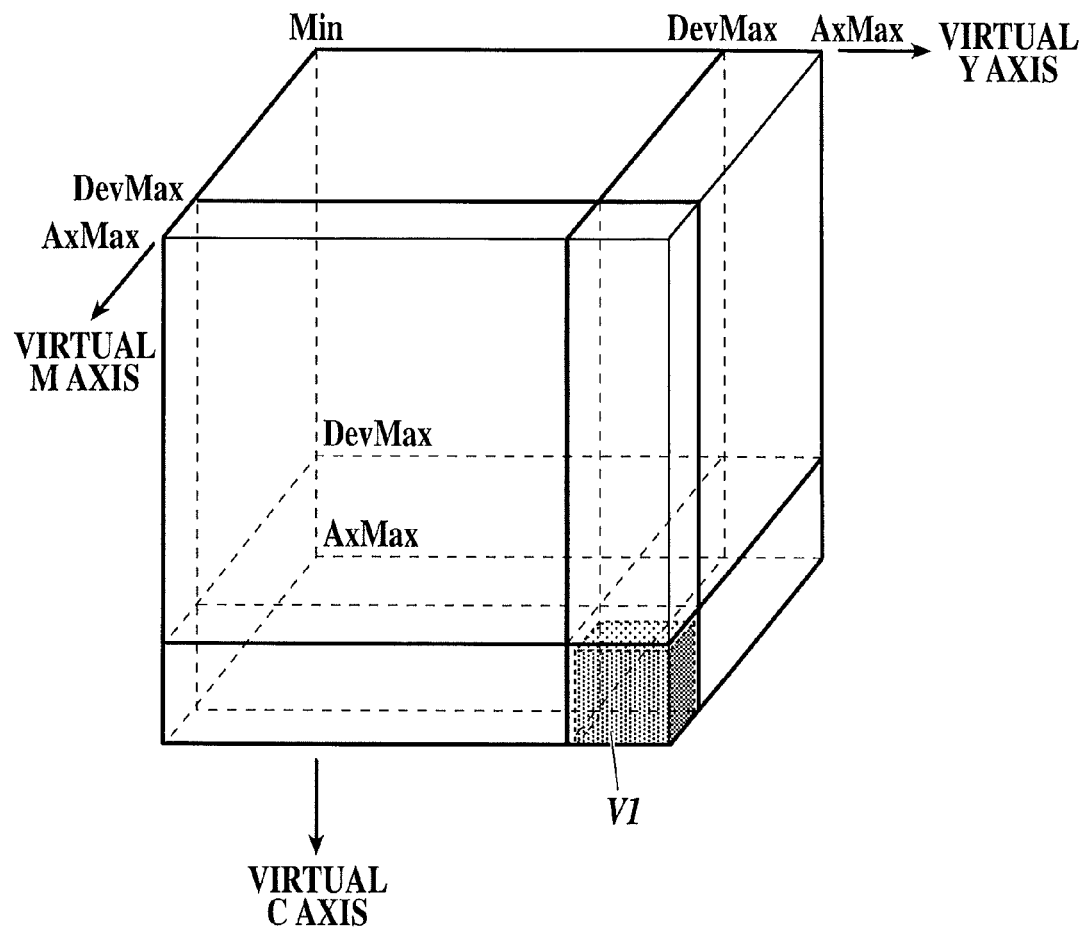
FIG. 5 is a diagram showing a portion in which all coordinates of the three virtual basic color axes are more than DevMax.

First, as shown in FIG. 5, the device values C 100%, M 100%, Y 100%, K 100% are corresponded to portion V1 where all coordinates of the three virtual basic color axes are more than DevMax.

Figure 6:
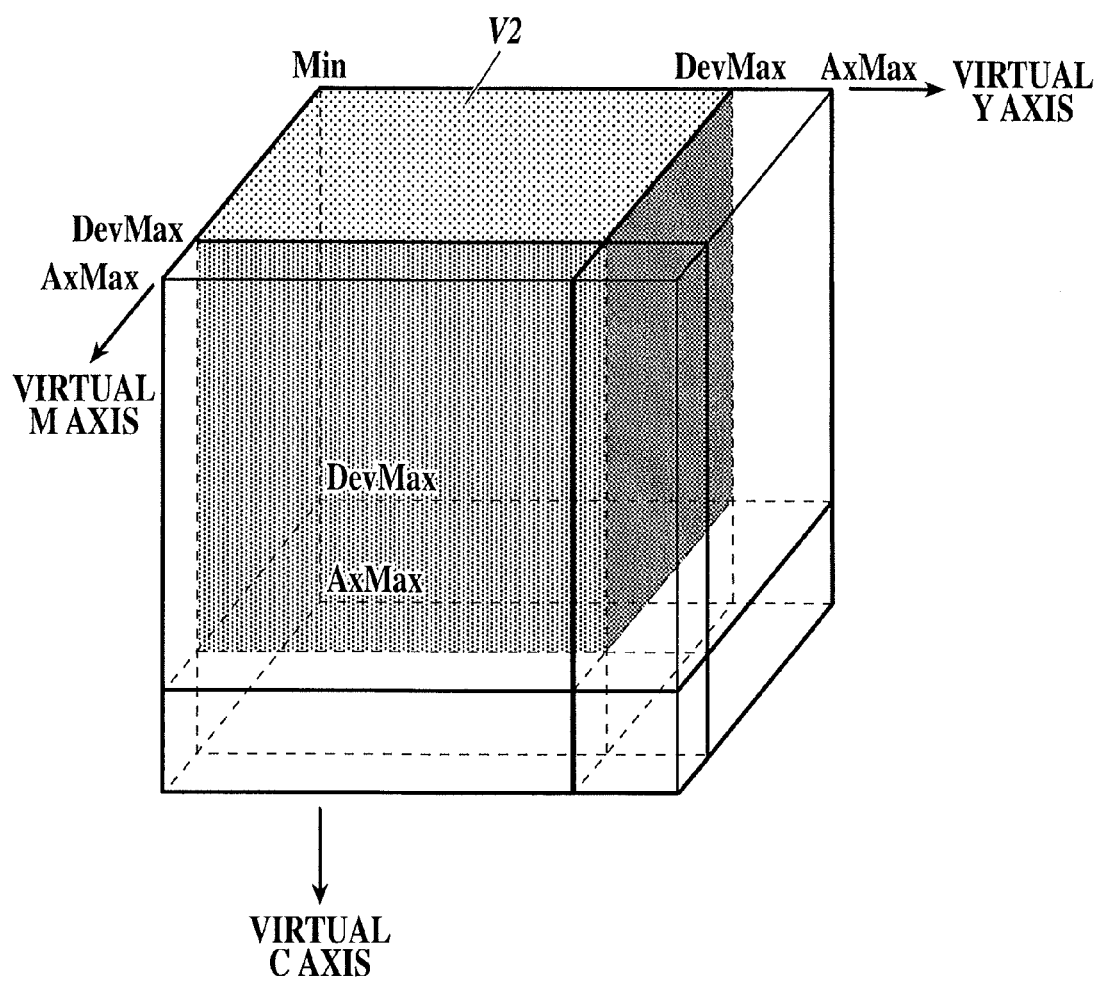
FIG. 6 is a diagram showing a portion in which all coordinates of the three virtual basic color axes are not more than DevMax.
Figure 8:
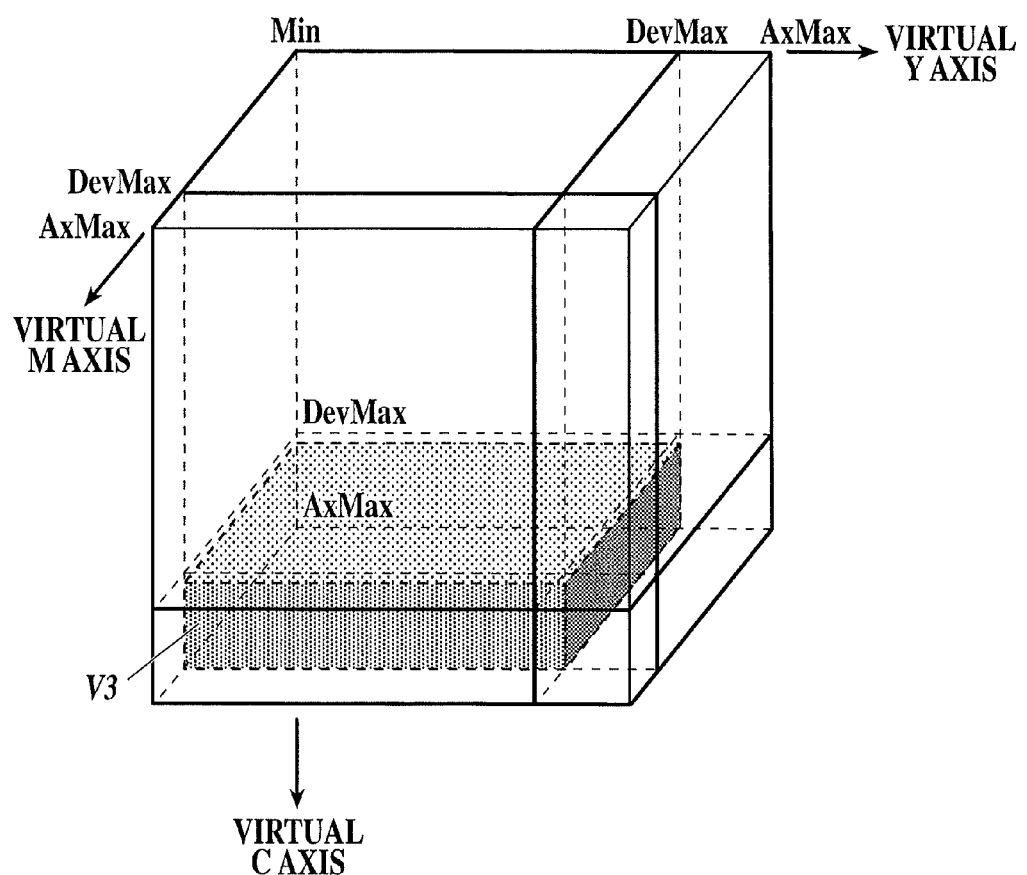
FIG. 8 is a diagram showing a portion in which the virtual M, Y coordinates are both no more than DevMax and the virtual C coordinate is more than DevMax.

Also, as shown in FIG. 6, the device CMY values are coordinate values of corresponding virtual basic color axes in portion V2 where all coordinates of the three virtual basic color axes are no more than DevMax. Regarding each virtual basic color axis, when the coordinate value is Min the device value is 0%, when the coordinate value is DevMax the device value is 100% and the value in between is a value of linear interpolation.

Next, the device CMY value other than the above are determined.

First, the device CMY value of a coordinate where the value of the virtual basic color axis coordinate is a combination of Min, DevMax and AxMax are determined using the "maximum reduction value" as shown in FIG. 7. In the present embodiment, the maximum reduction value=100.

Next, the device CMY value corresponding to the other grid points are determined sequentially. Here, the device C value is described as an example. The same calculation as the device C value is performed for the device M value and the device Y value, and therefore, the description regarding the device M value and the device Y value is omitted.

First, as shown in FIG. 7, the device C values are all 100% in a portion V3 where both the virtual M and Y coordinates are no more than DevMax and the virtual C coordinate is more than DevMax. Since the device C values are all 100% when both the virtual M and Y coordinates are no more than DevMax and the virtual C coordinate is DevMax, substantially, the device C values are 100% when both the virtual M and Y coordinate are no more than DevMax and the virtual C coordinate is DevMax or more.

Figure 9:
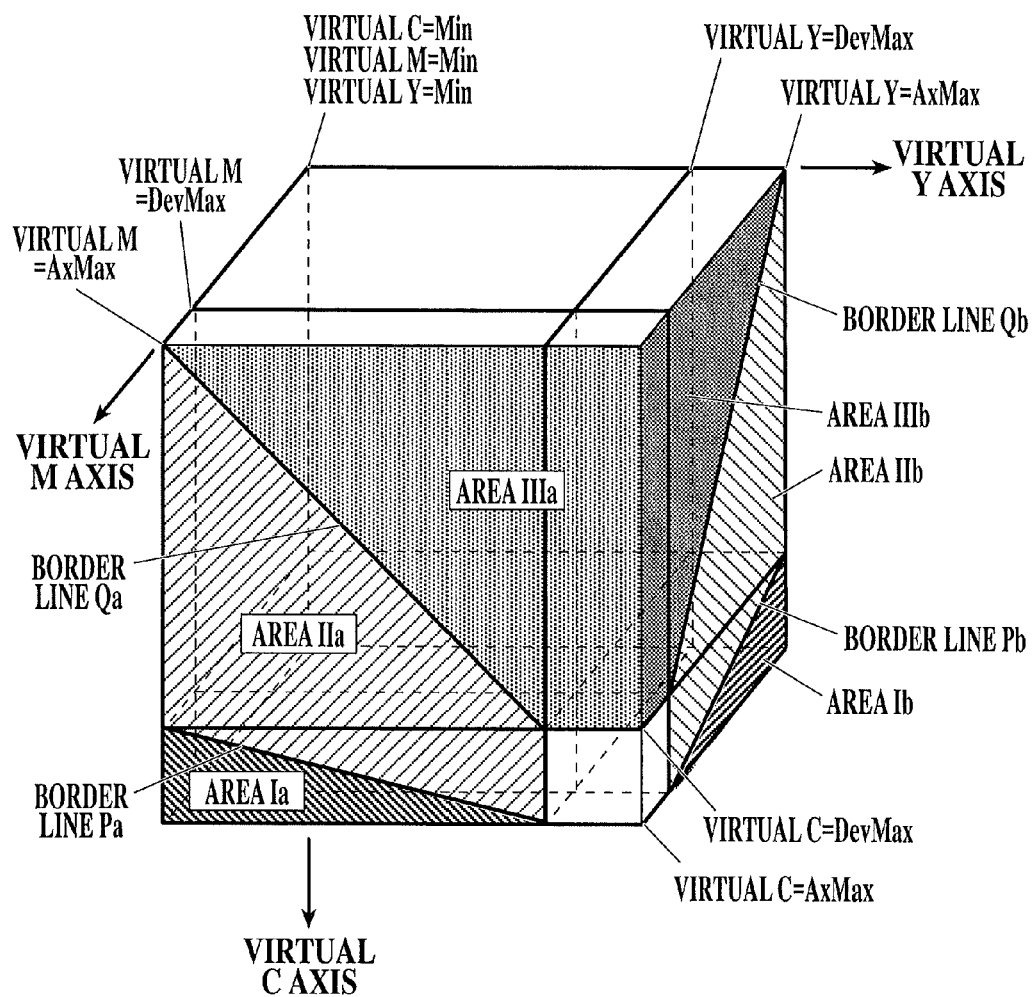
FIG. 9 is a diagram explaining a method to determine a device C value with a grid point on a plane of virtual M=AxMax and a grid point on a plane of virtual Y=AxMax.

Next, the device C value of a grid point on a plane of virtual M=AxMax is determined. As shown in FIG. 9, the plane of virtual M=AxMax is divided to areas Ia to IIIa.

Area Ia is an area including a triangle connecting three points of (virtual C, virtual M, virtual Y)=(DevMax, AxMax, 0), (AxMax, AxMax, 0), (AxMax, AxMax, DevMax).

Area IIa is an area including a trapezoid connecting four points of (virtual C, virtual M, virtual Y)=(0, AxMax, 0), (DevMax, AxMax, 0), (AxMax, AxMax, DevMax), (DevMax, AxMax, DevMax).

Area IIIa is an area including a trapezoid connecting four points of (virtual C, virtual M, virtual Y)=(0, AxMax, 0), (DevMax, AxMax, DevMax), (DevMax, AxMax, AxMax), (0, AxMax, AxMax).

The device C values of the area Ia are all 100%.

In the area IIIa, the device C value corresponds to the virtual C coordinate and when virtual C=Min the device C value=0%, when virtual C=DevMax the device C value=(100−maximum reduction value) %, and the value in between is a value of linear interpolation. Here, the maximum reduction value is 100 and therefore, the device C values of the area IIIa are all 0%.

As for the device C values of the area IIa, when on the border line Pa between the area Ia and the area IIa the value is 100%, when on the border line Qa between the area IIa and the area IIIa the value is determined from the virtual C coordinate by the method in the area IIIa, and the value in between is a value of linear interpolation along the virtual C axis.

Then, the device C value of the grid point between a plane which is virtual Y≦DevMax and virtual M=AxMax and a plane which is virtual Y≦DevMax and virtual M=DevMax (portion V4 shown in FIG. 10) is determined by linear interpolation from a value corresponding to a value on the two planes along the virtual M axis.

Similarly, the device C value of a grid point on a plane of virtual Y=AxMax is determined. As shown in FIG. 9, the plane of virtual Y=AxMax is divided into areas Ib to IIIb. Similar to obtaining the device C value with respect to the plane of virtual M=AxMax, the device C value of the grid point on the plane of virtual Y=AxMax is determined. The border line Pb is a border line between area Ib and area IIb and the border line Qb is a border line between area IIb and area IIIb.

Then, similarly, the device C value of the grid point between the plane of virtual M≦DevMax and virtual Y=AxMax and the plane of virtual M≦DevMax and virtual Y=AxMax (portion V5 of FIG. 10) is determined.

Figure 10:
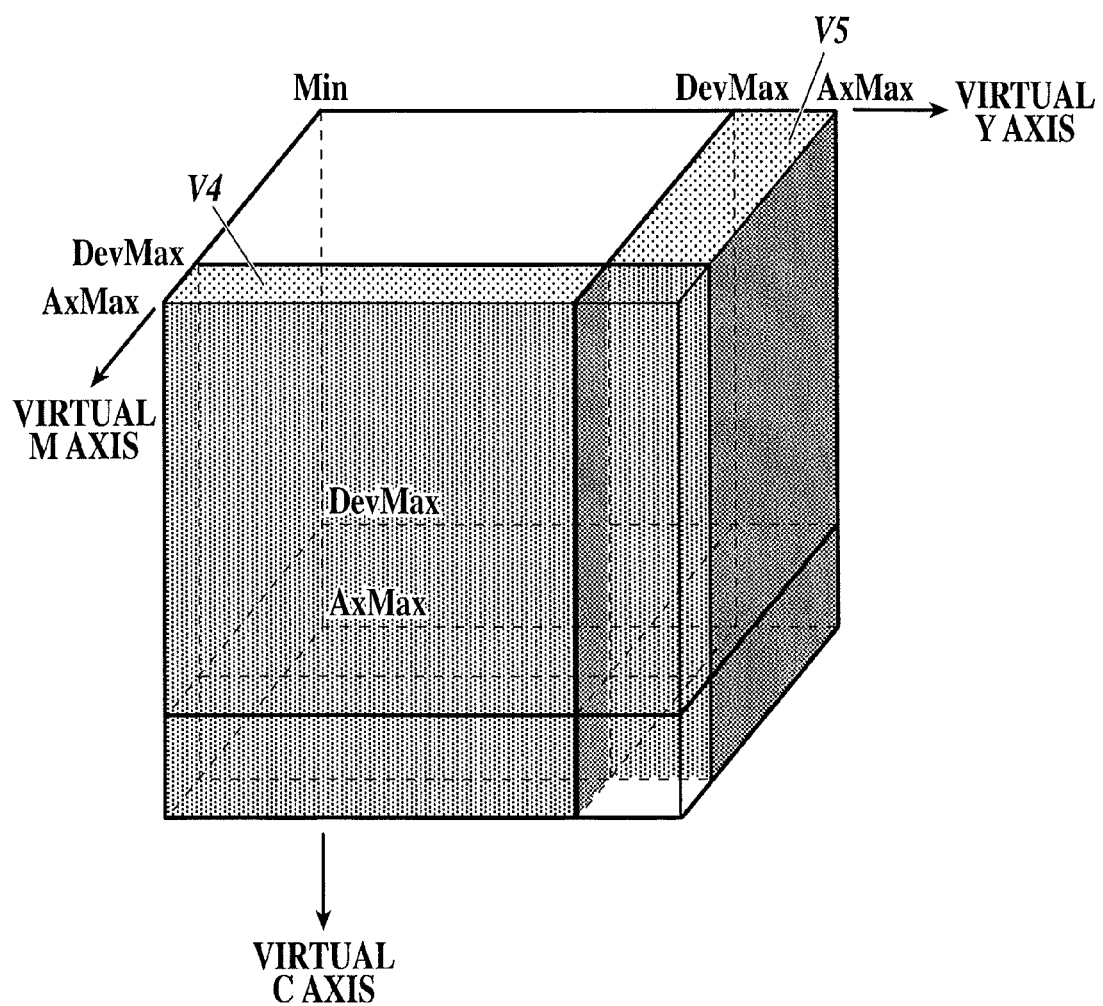
FIG. 10 is a diagram showing a portion between a plane in which virtual Y≦DevMax and virtual M=AxMax and a plane in which virtual Y≦DevMax and virtual M=DevMax and a portion between a plane in which virtual M≦DevMax and virtual Y=AxMax and a plane in which virtual M≦DevMax and virtual Y=DevMax.
Figure 11:
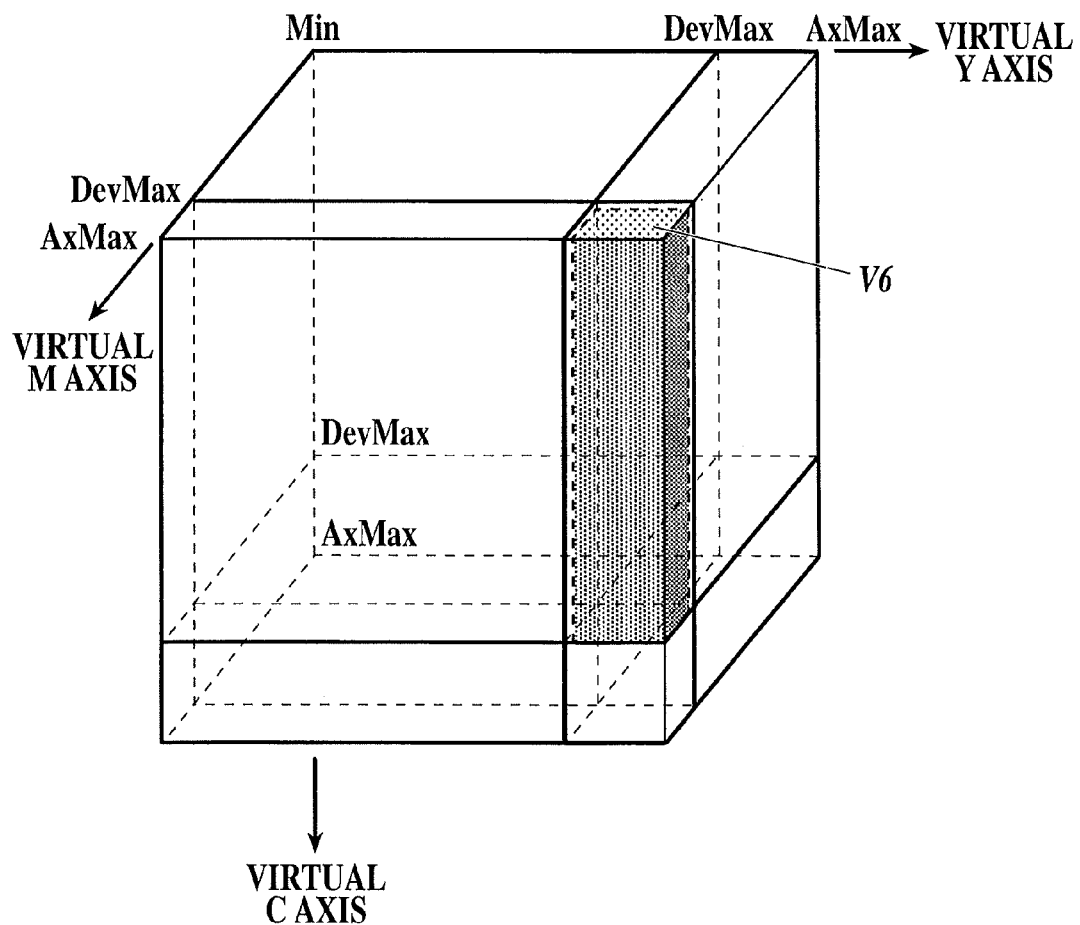
FIG. 11 is a diagram showing a portion in which virtual Y>DevMax and virtual M>DevMax and virtual C≦DevMax.

With this, the device C value of the portion V4 and the portion V5 shown in FIG. 10 can be obtained and therefore, the device C value of the portion V6 shown in FIG. 11 which is virtual Y>DevMax and virtual M>DevMax and virtual C≦DevMax can be determined by linear interpolation.

Next, the device K value is described. The device K value weakly monotonically increases as the minimum value among the three values of the virtual basic color axis coordinate (virtual C, virtual M, virtual Y) increases.

Figure 12:
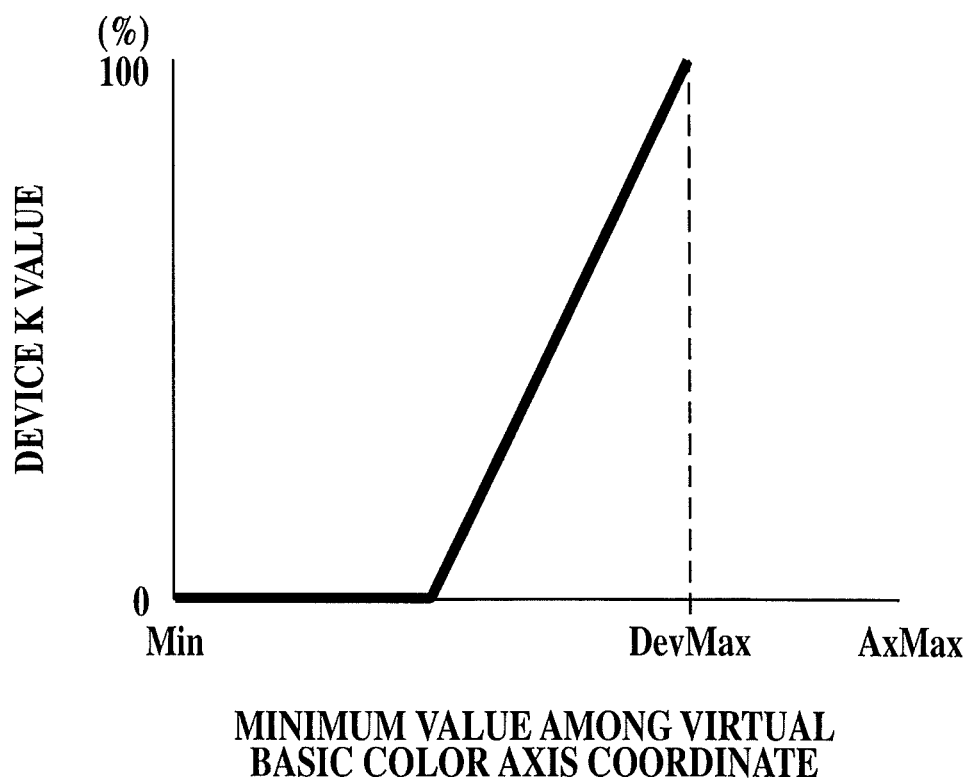
FIG. 12 is a diagram explaining a method to calculate the device K value of coordinates in which all coordinates of the three virtual basic color axes are no more than DevMax.

As for the coordinate in which all coordinates of the three virtual basic color axes are no more than DevMax, as shown in FIG. 12, the device K value is 0% when the minimum value among the three values of the virtual basic color axis coordinate is from Min to the median point between Min and DevMax, and the device K value is 100% when the minimum value among the three values of the virtual basic color axis coordinate is DevMax, and the values in between are determined by interpolation.

Figure 13:
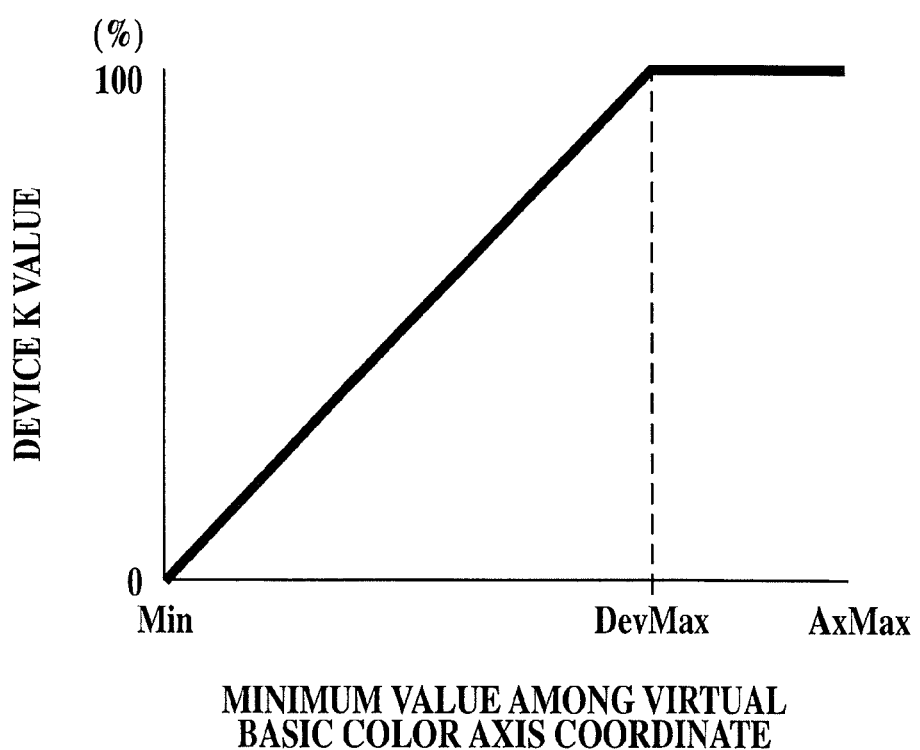
FIG. 13 is a diagram explaining a method to calculate the device K value of coordinates in which any of the coordinates of the three virtual basic color axes is AxMax.

Also, as for the coordinate in which any of the coordinates of the three virtual basic color axes is AxMax, as shown in FIG. 13, the device K value is 0% when the minimum value among the three values of the virtual basic color axis coordinate is Min, and the device K value is 100% when the minimum value among the three values of the virtual basic color axis coordinate is no less than DevMax and the values in between are obtained by interpolation.

The value between "coordinate in which all coordinates of the three virtual basic color axes are no more than DevMax" and "coordinate in which any one of the coordinates of the three virtual basic color axes is AxMax" is determined by interpolation. Similar to the method of determining the device CMY value, linear interpolation is performed from corresponding values of two planes of each plane of virtual basic color axis=DevMax and plane of virtual basic color axis=AxMax.

A plurality of forms other than the above of increasing the device K value according to the minimum value among the three values of the virtual basic color axis coordinate can be prepared and can be selected for each portion or can be selected from a combination prepared in advance.

The corresponding relation of "virtual basic color axis coordinate to device value" can be created as described above. The CPU 11 holds the corresponding relation of "virtual basic color axis coordinate to device value" in the RAM 13. The CPU 11 can write the corresponding relation of "virtual basic color axis coordinate to device value" in a file and store the file in the storage section 17.

Next, the CPU 11 creates the LUT of "virtual basic color axis coordinate to color value" based on the corresponding relation of "virtual basic color axis coordinate to device value" created in step S4 and LUT of "device value to color value" created in step S2 (step S5).

Specifically, first, the CPU 11 obtains the device value corresponding to each grid point of the virtual basic color axis coordinate from the corresponding relation of the "virtual basic color axis coordinate to device value" from the corresponding relation of "virtual basic color axis coordinate to device value". Next, the CPU 11 obtains the color value corresponding to the device value from the LUT of "device value to color value". Here, interpolation calculation is performed based on the color value corresponding to the neighborhood device value of the obtained device value according to necessity. Then, the CPU 11 stores the obtained color value in the LUT of "virtual basic color axis coordinate to color value". The LUT of "virtual basic color axis coordinate to color value" is held in the RAM 13, however, the LUT can be written in a file to be stored in the storage section 17.

Next, the CPU 11 obtains the corresponding virtual basic color axis coordinate of any one of the color values among the color values to be stored in the LUT of "color value to device value" (color conversion table 174) based on the LUT of "virtual basic color axis coordinate to color value" (step S6).

Here, convergence calculation processing is described. In the present embodiment, convergence calculation processing is used when obtaining virtual basic color axis coordinate (virtual CMY coordinate) corresponding to the color value to be stored in the LUT of "color value to device value" by interpolation calculation using LUT of "virtual basic color axis coordinate to color value".

In the description below, to simplify description, the processing is described assuming the virtual basic colors are two colors (for example, Y, M).

Figure 14:
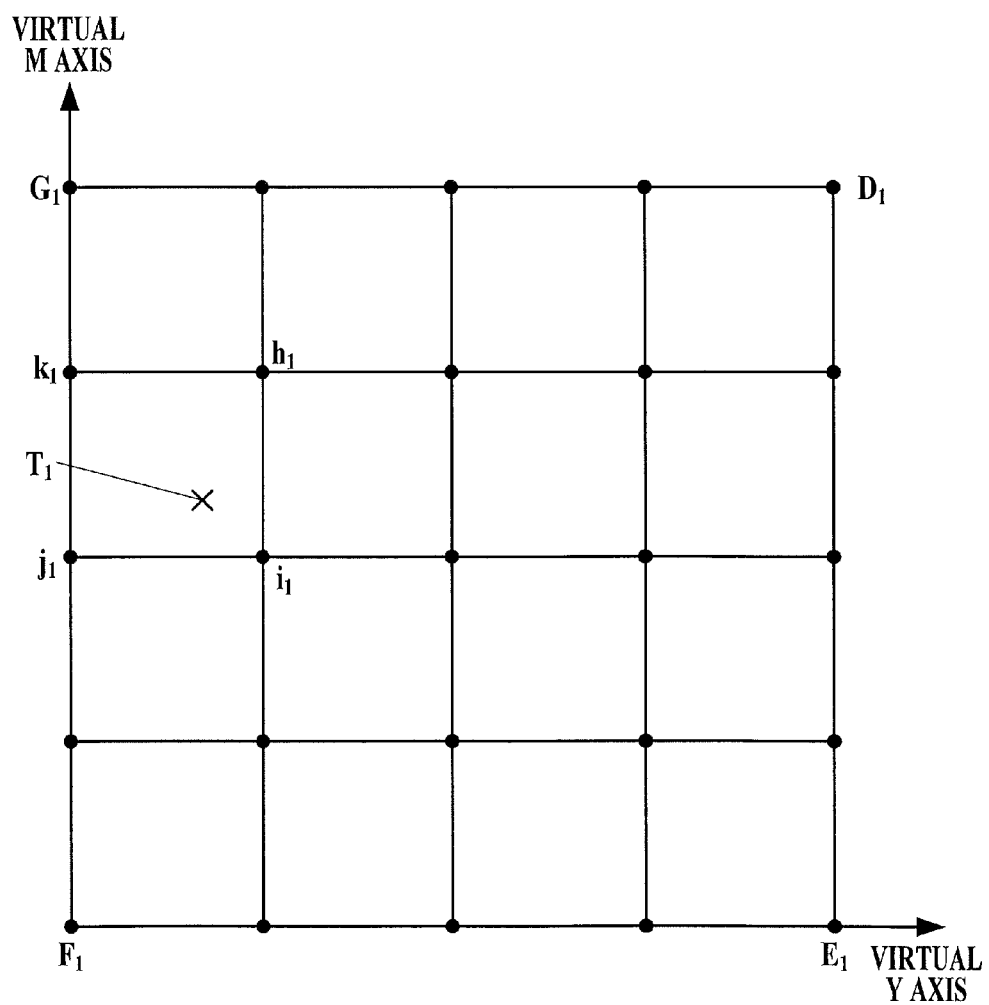
FIG. 14 is a diagram showing a virtual YM coordinate system.
Figure 15:
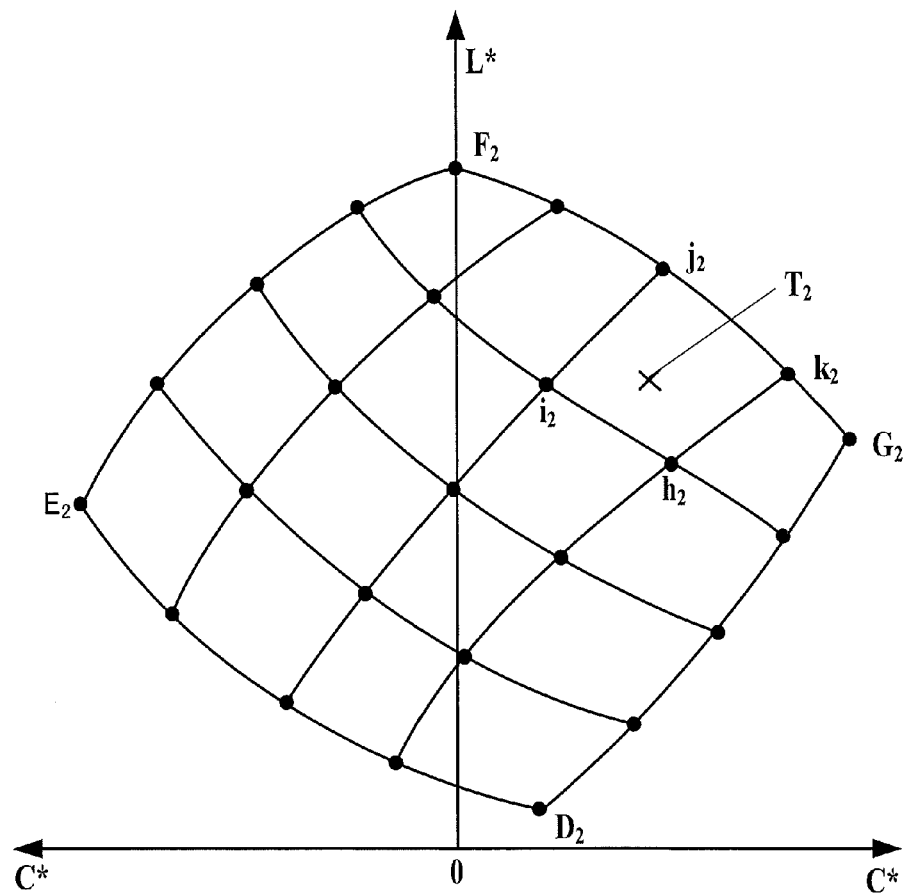
FIG. 15 is a diagram showing a color coordinate system showing brightness and saturation.

FIG. 14 is a virtual YM coordinate system. As shown in FIG. 14, there are grid points (5×5=25 points). FIG. 15 is a diagram plotting the value of L*a*b* color coordinate corresponding to each grid point of FIG. 14. In FIG. 15, in order to represent the L*a*b* space by two dimensions, the vertical axis is the brightness L* and the horizontal axis is the saturation C* in both left and right directions. Points $D_1$, $E_1$, $F_1$, $G_1$ of a square shown in FIG. 14 respectively correspond to grid points $D_2$, $E_2$, $F_2$, $G_2$ shown in FIG. 15. Next, the target value $T_2$ of the color to be reproduced in the L*a*b* color coordinate system is provided. The area where the target value $T_2$ of the color value is among the plurality of areas formed by the 25 grid points shown in FIG. 15 is obtained. As shown in FIG. 15, when the target value $T_2$ of the color value is in an area surrounded by grid points $h_2$, $i_2$, $j_2$, $k_2$, the combination of the virtual Y and virtual M in the corresponding virtual YM coordinate system (target value $T_1$) is estimated to be in the area surrounded by grid points $h_1$, $i_1$, $j_1$, $k_1$ as shown in FIG. 14.

Figure 16:
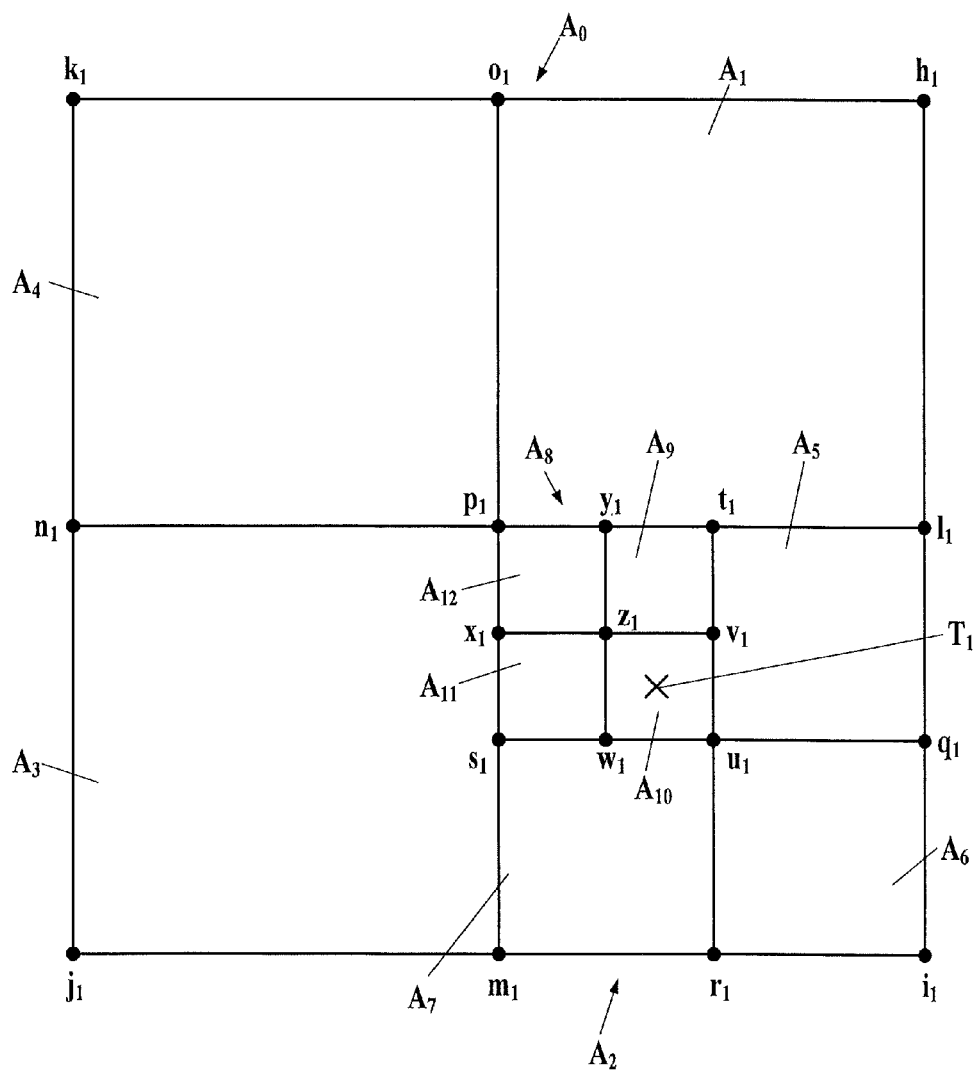
FIG. 16 is a diagram clipping out an area surrounded by grid points $h_1$, $i_1$, $j_1$, and $k_1$, in the virtual YM coordinate system.
Figure 17:
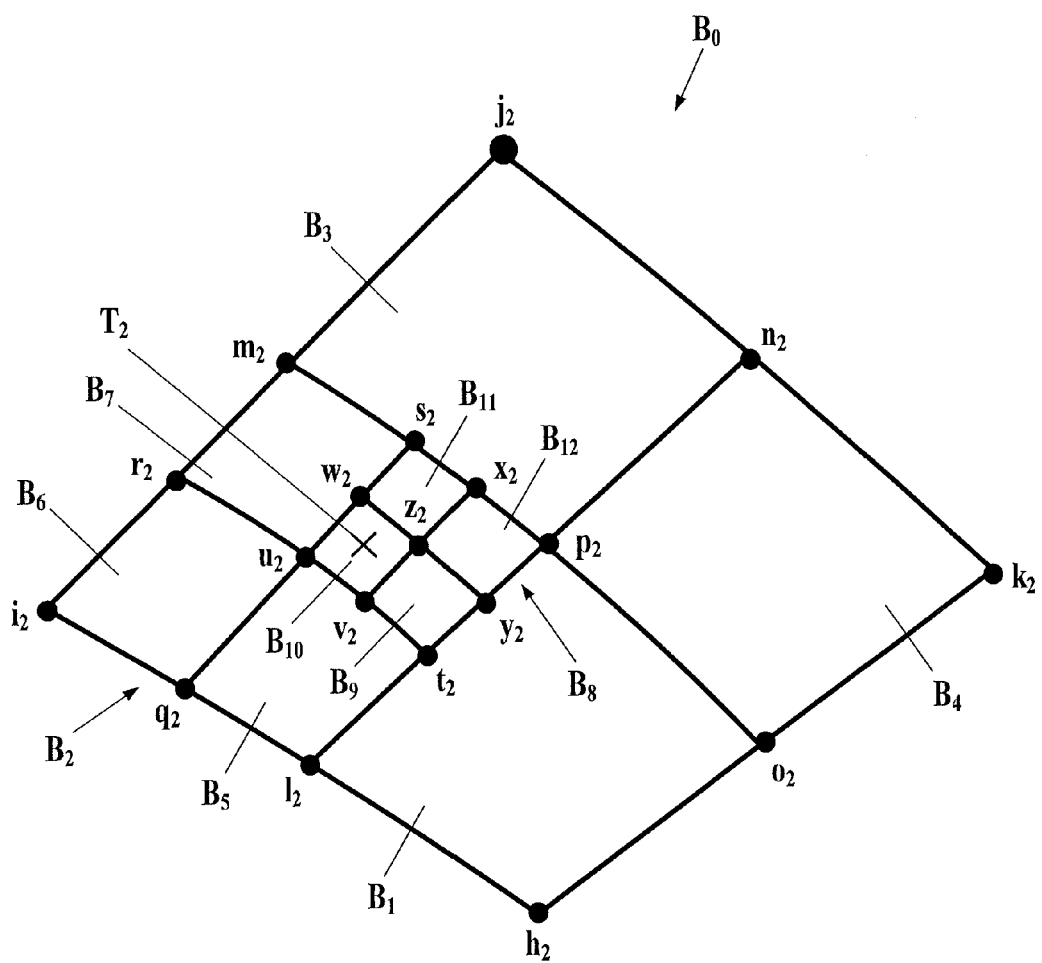
FIG. 17 is a diagram clipping out an area surrounded by grid points $h_2$, $i_2$, $j_2$, and $k_2$, in the color coordinate system showing brightness and saturation.

Then, the position where the target value $T_1$ is in the area formed by the grid points $h_1$, $i_1$, $j_1$, $k_1$ is obtained by convergence calculation processing corresponding the color coordinate system shown in FIG. 15 with the virtual YM coordinate system shown in FIG. 14. FIG. 16 is a diagram in which the area (area $A_0$) surrounded by the grid points $h_1$, $i_1$, $j_1$, $k_1$ in the virtual YM coordinate system is clipped out, and FIG. 17 is a diagram in which the area (area $B_0$) surrounded by the grid points $h_2$, $i_2$, $j_2$, $k_2$ in the color coordinate system showing the brightness and the saturation is clipped out.

Next, the area $A_0$ is equally divided into four areas of $A_1$ to $A_4$. The five dividing points $l_1$, $m_1$, $n_1$, $o_1$, $p_1$ are calculated by weighted averaging using the obtained surrounding grid points. Then, the values in the L*a*b* color coordinate system corresponding to the dividing points $l_1$, $m_1$, $n_1$, $o_1$, $p_1$ are plotted in the color coordinate system shown in FIG. 17 and the area where the target value $T_2$ of the color value is in among the four areas of $B_1$ to $B_4$ formed by the plotted dividing points $l_2$, $m_2/n_2/o_2/p_2$ is obtained. As shown in FIG. 17, when the target value $T_2$ of the color value is in area $B_2$, it is estimated that the target value $T_1$ in the virtual YM coordinate system is in the area $A_2$ as shown in FIG. 16.

Next, the area $A_2$ is equally divided into four areas of $A_5$ to $A_8$. The five dividing points $q_1$, $r_1$, $s_1$, $t_1$, $u_1$ are calculated by weighted averaging using the obtained surrounding grid points and dividing points. Then, the values in the L*a*b* color coordinate system corresponding to the dividing points $q_1$, $r_1$, $s_1$, $t_1$, $u_1$ are plotted in the color coordinate system shown in FIG. 17 and the area where the target value $T_2$ of the color value is among the four areas of $B_5$ to $B_8$ formed by the plotted dividing points $q_2$, $r_2$, $s_2$, $t_2$, $u_2$ is obtained. As shown in FIG. 17, when the target value $T_2$ of the color value is in area $B_8$, it is estimated that the target value $T_1$ in the virtual YM coordinate system is in the area $A_8$ as shown in FIG. 16.

Next, the area $A_8$ is equally divided into four areas of $A_9$ to $A_{12}$. The five dividing points $v_1$, $w_1$, $x_1$, $z_1$ are calculated by weighted averaging using the obtained surrounding grid points and dividing points. Then, the values in the L*a*b* color coordinate system corresponding to the dividing points $v_1$, $w_1$, $x_1$, $y_1$, $z_1$ are plotted in the color coordinate system shown in FIG. 17 and the area where the target value $T_2$ of the color value is among the four areas of $B_9$ to $B_{12}$ formed by the plotted dividing points $v_2, w_2, x_2 y_2, z_2$ is obtained. As shown in FIG. 17, when the target value $T_2$ of the color value is in area $B_{10}$, it is estimated that the target value $T_1$ in the virtual YM coordinate system is in the area $A_{10}$ as shown in FIG. 16.

By repeating such dividing of the area, the divided area gradually becomes smaller and finally converges. Then, by averaging the value of virtual Y and virtual M, of the four grid points or dividing points which form the convergent area, the target value $T_1$ in the virtual YM coordinate system can be obtained.

Figure 18:
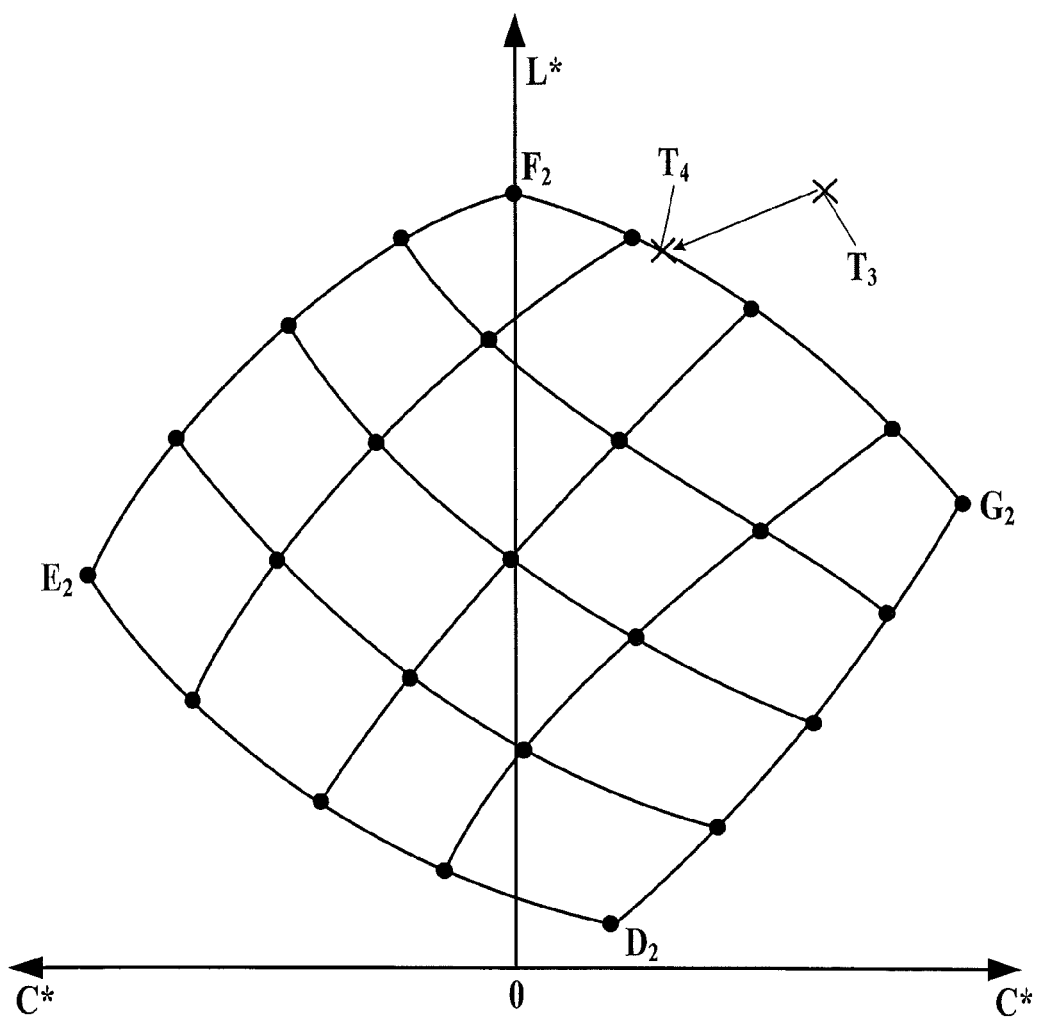
FIG. 18 is a diagram explaining a method to set a new target value when a target value of the color value is outside a color reproduction range.

When the color value to be stored in the LUT of "color value to device value" is outside the color reproduction range stored in the LUT of "virtual basic color axis coordinate to color value", the color value is moved inside the color reproduction range before obtaining the corresponding virtual basic color axis coordinate. Specifically, as shown in FIG. 18, when the target value $T_3$ of the color value is outside the color reproduction range formed by the grid points $D_2, E_2, F_2, G_2$, the target value $T_3$ needs to be moved inside the color reproduction range.

In this case, the target value $T_3$ is moved in the achromatic color direction and the coordinate of the intersection point between the straight line in the achromatic color direction and the border of the color reproduction range is set as the new target value $T_4$. Then, as shown in FIG. 19, the target value $T_5$ in the virtual YM coordinate system corresponding to the new target value $T_4$ is obtained.

The target value $T_3$ outside of the color reproduction range does not necessarily have to be moved to the border of the color reproduction range and can be moved to any position within the color reproduction range.

Here, in step S6, an example where convergence calculation processing is used when obtaining the virtual basic color axis coordinate (virtual CMY coordinate) corresponding to the color value is described, however, other well-known methods can be used.

Next, the CPU 11 obtains the device value corresponding to the virtual basic color axis coordinate obtained in step S6 based on the corresponding relation of "virtual basic color axis coordinate to device value" (step S7). The interpolation calculation is performed according to necessity based on the device value corresponding to the neighborhood virtual basic color axis coordinate of the obtained virtual basic color axis coordinate. Then, the CPU 11 stores the obtained device value in the LUT of "color value to device value" (step S8).

Next, the CPU 11 judges whether or not calculation of all color values to be stored in the LUT of "color value to device value" is finished (step S9). When calculation of all color values to be stored in the LUT of "color value to device value" is not finished (step S9; No), the processing returns to step S6 and the processing of step S6 to step S8 is repeated for another color value. With this, the LUT of "color value to device value" is created.

Alternatively, when the calculation for all color values to be stored in the LUT of "color value to device value" is finished (step S9; Yes), the CPU 11 stores the obtained LUT (color conversion table 174) of "color value to device value" in a form suitable for the purpose of use in the storage section 17 (step S10).

When the table is to be the B to A table of the ICC device profile, the table is suitably written in a file and stored together with various tags, LUT of "device value to color value", and other necessary information compliant with the specification of the ICC.

As described above, according to the color conversion table creating apparatus 10, the device value can be corresponded to the virtual basic color axis coordinate so that as the coordinate of one virtual basic color axis increases, there is a portion where the value of the basic color corresponding to at least one other virtual basic color axis reduces. Consequently, in the portion where, as the coordinate of one virtual basic color axis increases, the value of the basic color corresponding to another virtual basic color axis reduces, and the saturation of the color composed by the device value can be raised and the color gamut which can be output by the printer 20 can be enlarged.

Also, the device value is corresponded to the virtual basic color axis coordinate so that in the portion where, as the coordinate of one virtual basic color axis increases, the value of the basic color corresponding to another virtual basic color axis reduces, on the virtual basic color axis corresponding to at least one basic color other than the basic color in which the value reduces, the value of the corresponding basic color is more than the coordinate of the maximum value. Consequently, the color gamut which can be output by the printer can be enlarged and continuity of color can be favorably maintained in a wide color gamut.

Also, the device value is corresponded to the virtual basic color axis coordinate so that the value of black weakly monotonically increases as the minimum value of one of the three values of the virtual basic color axis coordinate increases. Consequently, the value of black can be determined according to the three values of the virtual basic color axis coordinate.

As described above, the virtual basic color axis coordinate (virtual CMY coordinate) used when creating the LUT of "color value to device value" (color conversion table 174) can be extended and the device value of the most outer periphery of the color gamut which was conventionally not used can be corresponded to the extended portion and the virtual basic color axis coordinate and the device value can be corresponded to maintain continuity of the device value as much as possible.

As a result, the color gamut which the printer 20 has can be used fully, and a color conversion table 174 with favorable color reproduction (especially in the low brightness section and the high saturation section) can be created. Also, by performing color conversion using the color conversion table 174 and performing output, output with favorable color reproduction can be obtained even when the printer 20 is limiting the toner amount.

Also since a general purpose chart such as ISO 12642, etc. is used, the chart can be easily obtained. Also, by selecting the necessary values from the data including overlapping color values included in the chart, a plurality of color conversion tables where the ratio between the device K value and the device CMY value is changed in the sufficient inner part of the color gamut can be created from the colorimetric data of one chart.

The description of the above described embodiment is an example of a color conversion table creating apparatus of the present embodiment, however the present invention is not limited to the above. The detailed configuration and the detailed operation of each section composing the apparatus can be modified without leaving the scope of the present invention.

For example, in the present embodiment, in the color conversion table creating processing (FIG. 4), the corresponding relation of "virtual basic color axis coordinate to device value" is created (step S4), however, when the maximum reduction value, the form of increasing the device K value with respect to the minimum value among the three values of the virtual basic color axis coordinate, etc. are set in advance, the corresponding relation of "virtual basic color axis coordinate to device value" can be calculated in advance.

Also, the above described embodiment is described with the printer 20 using toner of four colors of CMYK, however, the three basic colors with hue different from each other excluding black can be a combination of other colors.

In the description above, an example is disclosed using a ROM or hard disk as a computer readable medium storing a program to perform each processing, however, the present invention is not limited to this example. As other computer readable media, nonvolatile memory such as flash memory, etc., portable recording medium such as CD-ROM, etc. can be applied. Also, as a medium to provide data of a program through communication lines, a carrier wave can be applied.

According to an aspect of the preferred embodiments of the present invention, there is provided a recording medium recording a program for a computer which creates a color conversion table to convert a color value to a combination of values of black and three basic colors with hue different from each other to be output by a printer, the computer to allow a control section to perform the following functions of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

Consequently, according to the recording medium, regarding a color which is reproduced in a portion where, as a coordinate of one virtual basic color axis increases, a value of a basic color corresponding to another virtual basic color axis reduces, the saturation of the color can be increased. Therefore, the color gamut which can be output by the printer can be enlarged.

Preferably, in the recording medium, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

Consequently, according to the recording medium, the color gamut which can be output by the printer can be enlarged and continuity of color in a wide color gamut can be favorably maintained.

Preferably, in the recording medium, in the corresponding of the value of black to the virtual basic color axis coordinate in the second corresponding information, the value of black weakly monotonically increases as the minimum value among the three values of the virtual basic color axis coordinate increases.

Consequently, according to the recording medium, the value of black can be determined according to the three values of the virtual basic color axis coordinate.

According to another aspect of the preferred embodiments of the present invention, there is provided a color conversion table creating apparatus to create a color conversion table to convert a color value to a combination of values of black and three basic colors with hue different from each other to be output by a printer, the apparatus including a control section to perform the following functions of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

Consequently, according to the color conversion table creating apparatus, regarding a color which is reproduced in a portion where, as a coordinate of one virtual basic color axis increases, a value of a basic color corresponding to another virtual basic color axis reduces, the saturation of the color can be increased. Therefore, the color gamut which can be output by the printer can be enlarged.

Preferably, in the color conversion table creating apparatus, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

Consequently, according to the color conversion table creating apparatus, the color gamut which can be output by the printer can be enlarged and continuity of color in a wide color gamut can be favorably maintained.

Preferably, in the color conversion table creating apparatus, in the corresponding of the value of black to the virtual basic color axis coordinate in the second corresponding information, the value of black weakly monotonically increases as the minimum value among the three values of the virtual basic color axis coordinate increases.

Consequently, according to the color conversion table creating apparatus, the value of black can be determined according to the three values of the virtual basic color axis coordinate.

According to another aspect of the preferred embodiments of the present invention, there is provided a color conversion table creating method to create a color conversion table to convert a color value to a combination of values of black and three basic colors with hue different from each other to be output by a printer, the method including the following steps of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

Consequently, according to the color conversion table creating method, regarding a color which is reproduced in a portion where, as a coordinate of one virtual basic color axis increases, a value of a basic color corresponding to another virtual basic color axis reduces, the saturation of the color can be increased. Therefore, the color gamut which can be output by the printer can be enlarged.

Preferably, in the color conversion table creating method, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

Consequently, according to the color conversion table creating method, the color gamut which can be output by the printer can be enlarged and continuity of color in a wide color gamut can be favorably maintained.

Preferably, in the color conversion table creating method, in the corresponding of the value of black to the virtual basic color axis coordinate in the second corresponding information, the value of black weakly monotonically increases as the minimum value among the three values of the virtual basic color axis coordinate increases.

Consequently, according to the color conversion table creating method, the value of black can be determined according to the three values of the virtual basic color axis coordinate.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present U.S. patent application claims priority under the Paris Convention of Japanese Patent Application No. 2009-263451 filed on Nov. 19, 2009 to the Japanese Patent Office, which shall be a basis for correcting mistranslations.

What is claimed is:

1. A non-transitory computer readable storage medium recording a computer-executable control program for a computer which creates a color conversion table to convert a color value to a combination of values of black and three basic colors with hue different from each other to be output by a printer, the computer to allow a control section to perform the following functions of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

2. The non-transitory computer readable storage medium of claim 1, wherein, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

3. The non-transitory computer readable storage medium of claim 1, wherein, in the corresponding of the value of black to the virtual basic color axis coordinate in the second corresponding information, the value of black weakly monotonically increases as the minimum value among the three values of the virtual basic color axis coordinate increases.

4. A color conversion table creating apparatus to create a color conversion table to convert a color value to a combination of values of black and three basic colors with hue different from each other to be output by a printer, the apparatus comprising a control section to perform the following functions of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

5. The color conversion table creating apparatus of claim 4, wherein, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

6. The color conversion table creating apparatus of claim 4, wherein, in the corresponding of the value of black to the virtual basic color axis coordinate in the second corresponding information, the value of black weakly monotonically increases as the minimum value among the three values of the virtual basic color axis coordinate increases.

7. A color conversion table creating method to create a color conversion table to convert a color value to a combination of values of black and three basic colors with hue different from each other to be output by a printer, the method comprising the following steps of:

creating first corresponding information to show color value corresponding to a combination of values of black and three basic colors when a plurality of color patches are each output, the information created based on color values obtained by measuring color of each of the plurality of color patches output by the printer;

creating second corresponding information to correspond the combination of values of black and three basic colors to a virtual basic color axis coordinate determined by three virtual basic color axes corresponding to each of the three basic colors;

creating third corresponding information to show color value corresponding to the virtual basic color axis coordinate, the information created based on the second corresponding information and the first corresponding information; and obtaining virtual basic color axis coordinate corresponding to the color value based on the third corresponding information with respect to each color value to be stored in the color conversion table, obtaining a combination of values of black and three basic colors corresponding to the obtained virtual basic color axis coordinate based on the second corresponding information, and storing the obtained combination of values of black and three basic colors as a combination of values of black and three basic colors corresponding to the color value in the color conversion table, wherein the corresponding of the values of the three basic colors to the virtual basic color axis coordinate in the second corresponding information includes a portion in which, as a coordinate of one virtual basic color axis increases, a value of a basic color corresponding to at least one other virtual basic color axis reduces.

8. The color conversion table creating method of claim 7, wherein, the three virtual basic color axes further include a coordinate more than a coordinate in which the value of the corresponding three basic colors is a maximum value; and in the portion where the value of the basic color reduces, a value of a basic color is more than the coordinate which is a maximum value in the virtual basic color axis corresponding to at least one basic color other than the basic color in which the value reduces.

9. The color conversion table creating method of claim 7, wherein,
in the corresponding of the value of black to the virtual basic color axis coordinate in the second corresponding information, the value of black weakly monotonically increases as the minimum value among the three values of the virtual basic color axis coordinate increases.

* * * * *